(12) United States Patent
Staring et al.

(10) Patent No.: US 7,123,739 B2
(45) Date of Patent: Oct. 17, 2006

(54) COPY PROTECTION VIA MULTIPLE TESTS

(75) Inventors: Antonius A. M. Staring, Eindhoven (NL); Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 923 days.

(21) Appl. No.: 09/969,004

(22) Filed: Oct. 2, 2001

(65) Prior Publication Data

US 2002/0136427 A1 Sep. 26, 2002

Related U.S. Application Data

(60) Provisional application No. 60/271,400, filed on Feb. 26, 2001.

(51) Int. Cl.
*G06K 9/00* (2006.01)

(52) U.S. Cl. .................................................. 382/100

(58) Field of Classification Search ............... 382/100, 382/232; 380/2, 203, 210, 229, 231, 232, 380/234, 236, 241, 51, 287; 713/176, 179; 348/460, 461, 466; 386/94, 95; 725/25, 725/44, 47; 704/200.1; 283/72, 93, 113; 399/366; 705/57, 58; 358/3.28
See application file for complete search history.

(56) References Cited

U.S. PATENT DOCUMENTS 5,949,885 A * 9/1999 Leighton ...................... 380/54
5,960,081 A * 9/1999 Vynne et al. ................. 713/176
6,285,775 B1 * 9/2001 Wu et al. ...................... 382/100
6,625,295 B1 * 9/2003 Wolfgang et al. ........... 382/100
6,625,780 B1 * 9/2003 Charbon et al. ................ 716/1
6,748,533 B1 * 6/2004 Wu et al. ...................... 713/176

FOREIGN PATENT DOCUMENTS

WO WO 9912347 3/1999

OTHER PUBLICATIONS

U.S. Appl. No. 09/536,944, filed Mar. 28, 2000, Staring et al.

* cited by examiner

*Primary Examiner*—Andrew W. Johns
*Assistant Examiner*—Shervin Nakhjavan
(74) *Attorney, Agent, or Firm*—Gregory L. Thorne

(57) ABSTRACT

A multi-layered copy protection scheme distinguishes between security failures due to faulty watermark detection schemes and true security failures. At an initial security level, the fault-tolerance is low. If the security test fails at this initial security level, the process enters a next level of security, wherein the fault-tolerance is increased, but at the expense of additional processing time. If the security test again fails at this increased security level, the process enters a higher level of security, wherein the fault-tolerance is further increased, but at the further expense of additional processing time. Eventually, either the security test is passed, and the protected material is rendered, or a determination is made that the failures are not due to faults in the watermark detection process, indicating that the content material is, in fact, copy protected, but not authorized for rendering.

19 Claims, 1 Drawing Sheet

COPY PROTECTION VIA MULTIPLE TESTS

This application claims the benefit of U.S. Provisional Application No. 60/271,400, filed Feb. 26, 2001.

BACKGROUND OF THE INVENTION

1. Field of the Invention

This invention relates to the field of data protection, and in particular to protecting data from illicit copying from a remote location.

2. Description of Related Art

The protection of data is becoming an increasingly important area of security. In many situations, the authority to copy or otherwise process information is verified by evaluating the encoding of copy-protected material for particular characteristics. For example, copy-protected material may contain watermarks or other encodings that identify the material as being copy-protected, and also contains other encodings that identify whether this particular copy of the material is an authorized copy, and whether it can be copied again. For example, an authorized copy of content material may contain a robust watermark and a fragile watermark. The robust watermark is intended to be irremovable from the encoding of the content material. Attempting to remove the watermark causes damage to the content material. The fragile watermark is intended to be damaged when the content material is illicitly copied. For example, common fragile watermarks are damaged if the content material is compressed or otherwise altered. In this manner, content material that is compressed in order to be efficiently communicated via the Internet will be received with a robust watermark and a damaged fragile watermark. A content processing device that is configured to enforce copy protection rights in this example will be configured to detect the presence of a robust watermark, and prevent the processing of the content material containing this robust watermark unless the fragile watermark is also present.

The design of a watermarking encoding process and corresponding watermark detection involves a tradeoff among conflicting requirements. An ideal watermark should be undetectable during a conventional rendering of the content material, yet easily detectable by the watermark detector. As the watermark's detectability by the watermark detector increases, so too does its detectability during a conventional rendering; similarly, as the watermark's undetectability during a convention rendering decreases, so too does its undetectability by the watermark detector. Conventional watermarking processes are biased to assure that the watermarking process does not affect the quality of the rendering of the content material, often at the cost of reduced detectability by a watermark detector. That is, the likelihood of a watermark detector producing an erroneous decoding of a watermark is not insubstantial.

Given that watermark detection is not absolutely reliable, a need exists for a fault-tolerant watermark-based security process.

BRIEF SUMMARY OF THE INVENTION

It is an object of this invention to provide a robust and reliable copy protection scheme in the presence of a potentially unreliable watermark detection process. It is a further object of this invention to provide a copy protection scheme that is fault tolerant.

These objects and other are achieved by a multi-layered copy protection scheme. At an initial security level, the fault-tolerance is low. If the security test fails at this initial security level, the process enters a next level of security, wherein the fault-tolerance is increased, but at the expense of additional processing time. If the security test again fails at this increased security level, the process enters a higher level of security, wherein the fault-tolerance is further increased, but at the further expense of additional processing time. Eventually, either the security test is passed, and the material is rendered, or a determination is made that the failures are not due to faults in the watermark detection process, indicating that the content material is, in fact, copy protected, but not authorized for rendering.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

A variety of security schemes that are based on the decoding of one or more parameters from a watermark are known in the art, and further watermark-based security schemes can be expected to be developed in the future. Generally, however, these schemes assume that the watermark detection process is reliable, such that, when the watermark detection process reports a result, the security process effects a control based on the reported result.

Because common watermark detection processes are not 100% reliable, a fault in the detection process may be interpreted by the security process as an erroneous watermark, and the rendering of the content material may be inappropriately terminated. That is, the content material may be authorized for rendering, and contain a proper watermark, but the fault in the detection process may indicate an improper watermark, or no watermark. Similarly, but less likely, the content material may be unauthorized, and the fault in the detection process may inappropriately indicate an authorization, or may fail to identify the material as being copy protected.

In accordance with this invention, a multi-level security process is preferably employed to distinguish between faults in the detection process, and truly faulty watermarks.

Figure 1:
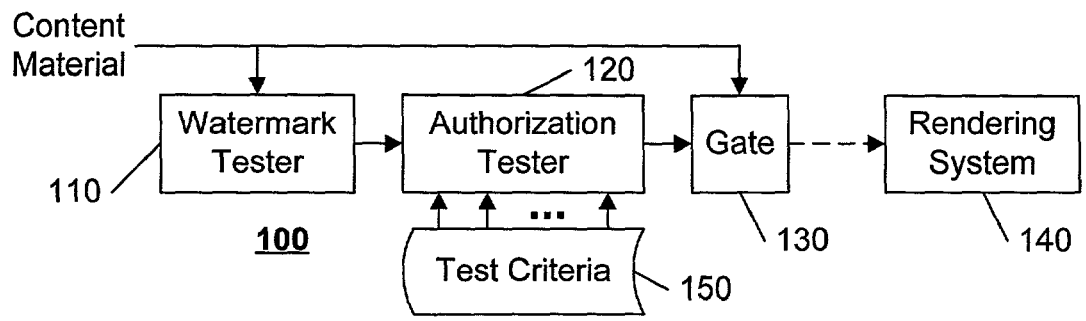
FIG. 1 illustrates an example block diagram of a security system in accordance with this invention.

FIG. 1 illustrates an example block diagram of a security system 100 in accordance with this invention. The system 100 includes a watermark tester 110, and an authorization system 120 that determines whether the input content material is authorized to be rendered, based on information provided by the watermark tester 110. For the purposes of this disclosure, the term "render" includes any subsequent transmission or processing of the input content material, including recording, broadcasting, playing back, converting, and so on. The authorization tester controls a gate 130 that determines whether the content material is presented to a rendering system 140, as indicated by the dashed line between the gate 130 and the rendering system 140.

In accordance with this invention, the authorization tester 120 is cofigured to accept test criteria 150 for determining whether the information provided by the watermark tester 110 warrants the connection or disconnection of the content material to the rendering system 140. In a conventional security system, the information from a watermark tester 110 is assumed to be reliable and accurate. This invention, on the other hand, is premised on the realization that watermark testers are inherently unreliable and/or inaccurate, due to the purposeful characteristic of the watermark that it not interfere with the rendering process. The test criteria 150 are specifically formulated to distinguish between a somewhat unreliable watermark tester 110 and an illicit copy of the content material.

Table 1 illustrates a set of example test criteria 150. Initially, at test level 1, a maximum 'test limit' of three watermark tests are conducted. Ideally, these three tests will each report a 'success' if the content material that is being tested has the appropriate watermark, and will each report a 'failure' if the content material that is being tested has a faulty or inappropriate watermark. Recognizing that the watermark testing process may itself be faulty, the test criteria 'fail limit' of table 1 indicates that one failure is acceptable. That is, if the three watermark tests at level 1 indicate two successes and one failure, the authorization tester 120 will declare the content material to be authorized.

TABLE 1

| Test Level | Test Limit | Fail Limit |
|---|---|---|
| 1 | 3 | 1 |
| 2 | 6 | 2 |
| 3 | 9 | 3 |

If, on the other hand, the test at level 1 indicates more than one failure, the authorization tester 150 enters the next test level, and applies the test limits and failure limits indicated in table 1 for test level 2. At level 2, a maximum of six watermarking tests are conducted. If two or fewer failures occur during these six watermarking tests, the authorization tester 150 will determine that the content material is authorized. If more than two failures occur, the authorization tester 150 enters the next test level, requiring no more than three failures in nine tests. Additional, or fewer, test levels may be included in the test criteria 150. The test procedure continues until the material is determined to be authorized, or until completion of the last test, whichever occurs first. If the last test is completed without a determination that the material is authorized, the material is rejected as being unauthorized.

The particular interpretation of the test criteria may vary, depending upon whether prior tests are intended to affect the determinations at future test levels. That is, for example, the test and failure limits of table 1 may be cumulative limits, or, the test and failure limits of table 1 may be independent for each test level.

In the cumulative example, when a second failure occurs at level 1, the system enters level 2 with a 'history' of the tests of level 1. Thus, because two failures have already occurred, the content material must pass the watermark tests for each subsequent test, until a total of six tests have been conducted (two or three at level 1 that produced the two failures, then four or three tests at level 2 with no failures). If, during the testing at level 2, a third failure occurs, the system enters level 3, and the content material must pass each of the remaining tests until a total of nine tests have been conducted.

In the independent example, when a second failure occurs at level 1, the system enters level 2, and restarts the testing process, allowing up to two additional failures within six additional tests.

The choice of test criteria, as well as the choice of a cumulative testing process through each level, or an independent testing process at each level, will be made dependent upon an estimate of the likelihood that the watermark tester 110 will report an erroneous result. If the watermark tester 110 rarely reports an erroneous result, the failure limit can be set to a very low value. Conversely, if the watermark tester 110 frequently reports erroneous results, a higher failure limit would be warranted. A cumulative test process will generally result in fewer tests being required, because the results of prior tests are not discarded.

When all of the test levels have been applied and the content material continues to fail each test, the authorization tester 120 will determine that the content material is not authorized, and will control the gate 130 to prevent the communication of the content material to the rendering system 140.

The use of this invention is hereinafter presented in the context of copending U.S. patent application "Protecting Content from Illicit Reproduction by Proof of Existence of a Complete Data Set via Self-Referencing Sections", U.S. Ser. No. 09/536,944, filed Mar. 28, 2000 for Antonius A. M. Staring, Michael A. Epstein, and Martin Rosner, incorporated by reference herein. In this copending application, each section of a data set is uniquely identified and this section identifier is encoded as a watermark that is embedded in each section, preferably as a combination of robust and fragile watermarks. When an item of the data set is presented for rendering, the security system requests random sections of the data set, and verifies that the appropriate watermark is present in each of the randomly selected sections. If a sufficient number of randomly selected sections are verified, the entire data set is determined to be present. If the entire data set is not present, the likelihood of randomly selecting an absent section is proportional to the amount of material that is missing from the entire data set. This security scheme is intended to discourage the illicit distribution of select segments of a larger data set.

In the context of digital audio recordings, for example, a compliant playback or recording device is configured to refuse to render an individual song in the absence of verification that the entire contents of the CD is present, via the random watermark testing. The time required to download an entire album on a CD in uncompressed digital form, even at DSL and cable modem speeds, can be expected to be greater than an hour, depending upon network loading and other factors. Thus, by requiring that the entire contents of the CD be present, at a download "cost" of over an hour, the likelihood of a theft of a song via a wide-scale distribution on the Internet is substantially reduced.

In accordance with this invention, the test criteria 150 of FIG. 1 will be determined based upon the degree of security required, and based upon the reliability of the watermark testing process 110. The test limit of table 1 is generally set to assure that a sufficiently large sample of the data set is verified, to assure that the entirety of the data set is present, and the fail limit is set to assure that the test does not result in the rejection of authorized content material due to occasional errors in the watermark testing process 110. The partitioning of the test into multiple levels provides for efficient testing, when it becomes very obvious, based on a low failure rate, that the data set must be present. That is, the lower level tests are preferably structured with a low failure, so that, if the watermarking test is reliable, the test at the lower level ends with an authorization to render the material, if the material is authorized. Time is spent performing the subsequent level tests only if the entirety of the data set is not present, or when a premature rejection of content material is to be avoided.

Figure 2:
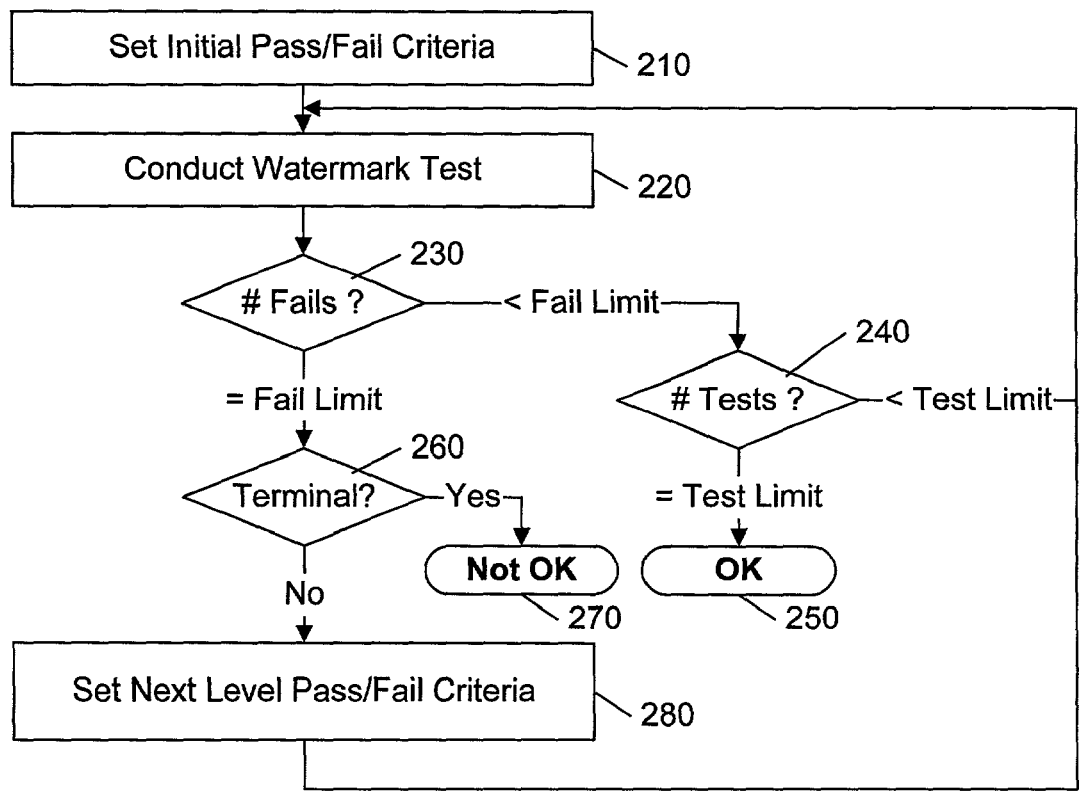
FIG. 2 illustrates an example flow diagram of a security system in accordance with this invention.

FIG. 2 illustrates an example flow diagram for a multi-level authorization process in accordance with this invention. At 210, the initial pass/fail test criteria are set, corresponding for example to the first level test of table 1. At 220, a watermark test is conducted, and a pass/fail result is produced.

If the number of failures thus far is below the 'fail limit', at 230, the number of tests conducted thus far is assessed. If, at 240, the number of tests thus far is below the 'test limit', the process loops back to conduct the next watermark test, at 220. Otherwise, if the number of tests conducted thus far equals the test limit, the process terminates with a "authorized" result, at 250.

If the number of failures thus far has reached the 'fail limit', at 230, a determination is made, at 260, as to whether there are additional test levels available. If not, if the terminal tests have been conducted, then the process terminates with a "non-authorized" result, at 270. If, at 260, additional test levels are available, then the next set of test criteria replaces the prior set of test criteria, at 280, and the process loops back to conduct the next watermark test, at 220. As discussed above, when the next level criteria is loaded, at 280, the prior accumulation of tests and failures is either discarded, for independent test levels, or not discarded, for accumulated test levels.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the test criteria 150 of FIG. 1 are presented above as a relatively static set of criteria. Adaptive testing may also be conducted, wherein the test criteria at each level is determined based on past performance, or based on external parameters, such as a 'noise figure' or 'quality figure' that may be provided by the watermark tester 110, or other device. The past performance could include a history of errors associated with the watermark tester 110 (e.g. an average number of reported failures for material that was eventually determined to be authorized), wherein the failure limit is dynamically set based on the prior error rate. Additionally, the past performance could include a history of attempted renderings of unauthorized material, wherein the test limit is dynamically set based on the rate of prior authorizations or un-authorizations. These and other system configuration and optimization features will be evident to one of ordinary skill in the art in view of this disclosure, and are included within the scope of the following claims.

We claim:

1. A security system for protecting content material, comprising:
    a watermark tester that is configured to detect one or more parameters associated with a watermark that is associated with the content material, and
    an authorization tester, operably coupled to the watermark tester, that is configured to determine an authorization corresponding to the content material, based on the one or more parameters detected by the watermark tester, and one or more test criteria, wherein
    the one or more test criteria are based on a likelihood of error associated with the watermark tester in determining the one or more parameters associated with the watermark and
    the authorization tester is configured to select a next set of criteria of the plurality of test levels when the authorization tester fails to determine an authorization based on a prior set of criteria of the plurality of test levels.

2. The security system of claim 1, wherein
the one or more test criteria includes a set of criteria for each of a plurality of test levels.

3. The security system of claim 2, wherein
each set of criteria includes:
    a test limit that corresponds to a minimum number of tests that are to be conducted by the watermark tester to determine the authorization, and
    a fail limit that corresponds to a maximum number of failures to determine the authorization.

4. The security system of claim 1, wherein
the authorization tester applies the next set of criteria based on results of the watermark tester while applying the prior set of criteria.

5. The security system of claim 1, wherein
the authorization tester applies the next set of criteria independent of results of the watermark tester while applying the prior set of criteria.

6. The security system of claim 1, wherein
the one or more test criteria includes:
    a test limit that corresponds to a minimum number of tests that are to be conducted by the watermark tester to determine the authorization, and
    a fail limit that corresponds to a maximum number of failures to determine the authorization.

7. The security system of claim 1, wherein
the one or more test criteria includes
    a test limit that corresponds to a maximum number of tests that are to be conducted by the watermark tester to reject the content material.

8. The security system of claim 1, wherein
the authorization tester is configured to determine whether an entirety of a data set is present, based on watermarks associated with segments of the data set.

9. The security system of claim 8, wherein
the authorization tester is configured to select a random segment of the data set for testing by the watermark tester.

10. A method for protecting content material, comprising:
detecting one or more parameters associated with a watermark that is associated with the content material, and
determining an authorization corresponding to the content material, based on the one or more parameters and one or more test criteria, wherein
the one or more test criteria are based on a likelihood of error associated with the detecting of the one or more parameters associated with the watermark, wherein
determining the authorization includes:
    selecting a next set of criteria of the plurality of test levels upon failing to determine an authorization based on a prior set of criteria of the plurality of test levels.

11. The method of claim 10, wherein
the one or more test criteria includes a set of criteria for each of a plurality of test levels.

12. The method of claim 11, wherein
each set of criteria includes:
    a test limit that corresponds to a minimum number of tests that are to be conducted to determine the authorization, and
    a fail limit that corresponds to a maximum number of failures to determine the authorization.

13. The method of claim 10, wherein
determining the authorization based on the next set of criteria includes results while applying the prior set of criteria.

14. The method of claim 10, wherein
determining the authorization based on the next set of criteria is independent of results while applying the prior set of criteria.

15. The method of claim 10, wherein
the one or more test criteria includes:
    a test limit that corresponds to a minimum number of tests that are to be conducted to determine the authorization, and
    a fail limit that corresponds to a maximum number of failures to determine the authorization.

16. The method of claim 10, wherein
the one or more test criteria includes
a test limit that corresponds to a maximum number of tests that are to be conducted to reject the content material.

17. The method of claim 10, wherein
determining the authorization corresponds to determining whether an entirety of a data set is present, based on watermarks associated with segments of the data set.

18. The method of claim 17, further including
selecting a random segment of the data set.

19. A security system for protecting content material, comprising:
a watermark tester that is configured to detect one or more parameters associated with a watermark that is associated with the content material, and
an authorization tester, operably coupled to the watermark tester, that is configured to determine an authorization corresponding to the content material, based on the one or more parameters detected by the watermark tester, and one or more test criteria, wherein
the one or more test criteria are based on a likelihood of error associated with the watermark tester in determining the one or more parameters associated with the watermark, and wherein
the one or more test criteria includes
a test limit that corresponds to a maximum number of tests that are to be conducted by the watermark tester to reject the content material.

* * * * *